US012641239B2

(12) United States Patent
Andersson et al.

(10) Patent No.: US 12,641,239 B2
(45) Date of Patent: May 26, 2026

(54) FILTERING FOR IMAGE ENCODING AND DECODING

(71) Applicant: Telefonaktiebolaget LM Ericsson (publ), Stockholm (SE)

(72) Inventors: Kenneth Andersson, Gävle (SE); Jacob Ström, Stockholm (SE); Du Liu, Solna (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 14 days.

(21) Appl. No.: 18/726,733

(22) PCT Filed: Dec. 14, 2022

(86) PCT No.: PCT/SE2022/051173
§ 371 (c)(1),
(2) Date: Jul. 3, 2024

(87) PCT Pub. No.: WO2023/132765
PCT Pub. Date: Jul. 13, 2023

(65) Prior Publication Data
US 2025/0071283 A1      Feb. 27, 2025

Related U.S. Application Data

(60) Provisional application No. 63/296,289, filed on Jan. 4, 2022.

(51) Int. Cl.
*H04N 19/132*          (2014.01)
*H04N 19/82*           (2014.01)
(52) U.S. Cl.
CPC ........... *H04N 19/132* (2014.11); *H04N 19/82* (2014.11)

(58) Field of Classification Search
CPC .... H04N 19/132; H04N 19/82; H04N 19/117; H04N 19/176; G06N 3/0455; G06N 3/098
See application file for complete search history.

(56) References Cited

U.S. PATENT DOCUMENTS

2022/0148131 A1    5/2022    Wang et al.
2022/0286695 A1    9/2022    Li et al.
(Continued)

FOREIGN PATENT DOCUMENTS

EP            3451293 A1      3/2019
WO        2021165569 A1      8/2021
(Continued)

OTHER PUBLICATIONS

International Search Report and Written Opinion dated Jan. 19, 2023 in International Application No. PCT/SE2022/051173 (14 pages).
(Continued)

*Primary Examiner* — Hesham K Abouzahra
(74) *Attorney, Agent, or Firm* — Rothwell, Figg, Ernst & Manbeck, P.C.

(57)                    ABSTRACT

There is provided a method. The method comprises obtaining a weighting factor. The method comprises obtaining input sample values. The method further comprises determining neural network, NN, filtered sample values by providing the input sample values to a neural network. The method comprises determining revised sample values based on (i) the weighting factor and (ii) the NN filtered sample values.

20 Claims, 8 Drawing Sheets

(56)             References Cited

U.S. PATENT DOCUMENTS

| | | | |
|---|---|---|---|
| 2022/0337857 A1 | 10/2022 | Choi et al. | |
| 2022/0405979 A1 | 12/2022 | Ding et al. | |
| 2023/0188713 A1* | 6/2023 | Bordes ................. | H04N 19/117 |
| | | | 375/240.02 |

FOREIGN PATENT DOCUMENTS

| | | | |
|---|---|---|---|
| WO | 2021244884 A1 | 12/2021 | |
| WO | 2022072659 A1 | 4/2022 | |
| WO | 2022235595 A1 | 11/2022 | |

OTHER PUBLICATIONS

International Preliminary Report on Patentability with Written Opinion dated Jun. 20, 2024 in International Application No. PCT/SE2022/051173 (9 pages).

Bross, B. et al., "General Video Coding Technology in Responses to the Joint Call for Proposals on Video Compression With Capability Beyond HEVC", IEEE Transactions on Circuits and Systems for Video Technology, vol. 30, No. 5, May 2020 (15 pages).

Gao, H. et al., "Decoder-Side Motion Vector Refinement in VVC: Algorithm and Hardware Implementation Considerations", IEEE Transactions on Circuits and Systems for Video Technology, vol. 31, No. 8, Aug. 2021 (15 pages).

Wang, H. et al., "EE1-1.4: Tests on Neural Network-based In-Loop Filter with Constrained Computational Complexity", Document: JVET-X0140-v1, Joint Video Experts Team (JVET) of ITU-T SG 16 WP 3 and ISO/IEC JTC 1/SC 29, 24th Meeting, by teleconference, Oct. 6-15, 2021 (5 pages).

Andersson, K. et al., "EE1-related: Combination of VVC deblocking and NN loop filtering", Document: JVET-Y0098-v1, Joint Video Experts Team (JVET) of ITU-T SG 16 WP 3 and ISO/IEC JTC 1/SC 29, 25th Meeting, by teleconference, Jan. 12-21, 2022 (3 pages).

Li, Y. et al., "EE1-1.2: Test on Deep In-Loop Filter with Adaptive Parameter Selection and Residual Scaling". Document: JVET-Y0143-v1, Joint Video Experts Team (JVET) of ITU-T SG 16 WP 3 and ISO/IEC JTC 1/SC 29, 25th Meeting, by teleconference, Jan. 12-21, 2022 (6 pages).

* cited by examiner

700 s702

Obtaining a weighting factor s704

Obtaining input sample values s706

Determining neural network filtered sample values
by providing the input sample values to a neural network s708

Determining revised sample values based on (i) the weighting factor
and (ii) the NN filtered sample values

FILTERING FOR IMAGE ENCODING AND DECODING

CROSS REFERENCE TO RELATED APPLICATIONS

This application is a 35 U.S.C. § 371 National Stage of International Patent Application No. PCT/SE2022/051173, filed 2022 Dec. 14, which claims priority to U.S. Provisional Application No. 63/296,289, filed on 2022 Jan. 4. The above identified applications are incorporated by this reference.

TECHNICAL FIELD

This disclosure relates to methods and apparatus for providing improved filtering for image encoding and decoding.

BACKGROUND

A video sequence consists of a series of images where each image consists of one or more components. In this disclosure, the terms "images," "pictures," or "frames" are interchangeably used. Each component can be described as a two-dimensional rectangular array of samples having values. It is common that an image in a video sequence consists of three components: one luma component Y of which the sample values are luma values and two chroma components Cb and Cr of which the sample values are chroma values. Other examples of the components include Y'CbCr, Yuv, and ICtCt.

In ICtCt, I is the "intensity luma" component. For the remainder of this disclosure, any luma component Y', Y, or I is referred as Y or simply luma. It is common that the dimensions of the chroma components are smaller than the luma components by a factor of two in each dimension. For example, the size of the luma component of an High Definition (HD) image is 1920×1080 and each of the chroma components has the dimension of 960×540. The chroma components are sometimes referred to as color components.

A "block" is a two-dimensional array of samples. In video coding, each component is split into one or more blocks and the coded video bitstream is a series of blocks. It is common in video coding that an image is split into units each of which covers a specific area of the image. Each unit consists of all blocks from all components that make up that specific area and each block belongs fully to one unit. The macroblock in H.264 and the Coding unit (CU) in High Efficiency Video Coding (HEVC) are examples of units.

In HEVC, each image is partitioned into coding tree units (CTU). A CTU consists of an N×N block of luma samples and two M×M corresponding chroma blocks. A CTU in HEVC is like macroblocks in H.264 and earlier standards but in contrast to macroblocks, the CTU size is configurable. Most often, however, the CTU size in HEVC is set to 64×64 luma samples. Each CTU can be recursively quadtree split. The root of the quadtree is then associated with the CTU. The quadtree is split until a leaf is reached, which is referred to as the coding unit (CU). A CU in HEVC always consist of a luma block with equal height and width. How each CTU is split is conveyed in the bitstream. The CU is also the root node of two other trees—the prediction tree that has prediction units (PUs) as nodes and the transform tree that has transform units (TUs) as nodes.

While some decoding processes in HEVC are done on the CU level, some are done on the PU level and some on TU level. Boundaries between PUs and boundaries between TUs are filtered by a deblocking filter to reduce discontinuities between PUs and TUs. In HEVC, there exist two kinds of prediction types for a PU-intra prediction which only uses prediction from previously decoded samples of the current image and inter prediction which uses prediction form at least one previously decoded image.

Deblocking is used to remove discontinuities between block boundaries and has been included in all recent standards (H.263, H.264, H.265/HEVC and H.266/VVC). The deblocking smooths out the discontinuities by filtering across vertical and horizontal boundaries. The effect of deblocking is mostly subjective but the deblocking can achieve rate savings. In HEVC, deblocking is first applied on vertical boundaries and then on horizontal boundaries. The boundaries are either TU boundaries or PU boundaries. To enable parallel friendly deblocking, the deblocking is performed on an 8×8 sample grid.

A deblocking filter strength parameter (bs) is set for each 4 sample part of the boundary. If the value of bs is larger than 0, then deblocking may be applied. The larger the boundary strength is, the stronger filtering is applied. First it is checked if any of the blocks at a PU boundary between the blocks is an intra predicted block. If so, bs is set to =2. On the other hand, if both blocks use inter prediction but they use different reference frames or have significantly different motion vectors, then bs is set to =1. It is also checked if a TU boundary between the blocks has non-zero transform coefficients in at least one of the blocks (code block flag CBF equal to 1). If so, then bs is set to =1. This first check sets a boundary strength (bs) which is larger than 0 to indicate that deblocking should be applied for a 4 sample part of the boundary. The larger the boundary strength is, the stronger filtering is applied.

To reduce and/or avoid removing natural structures when deblocking, a check that there are not any natural structures on respective sides of the boundary is then applied for luma. In HEVC, gradient calculations are used on respective sides of the boundary using the following inequality: $\text{abs}(p0-2*p1+p2)+\text{abs}(q0-2*q1+q2)<\text{beta}$, where beta (also denoted "B") is a parameter based on the quantization parameter for the block and $p0$, $p1$, and $p2$ are samples on one side of the block boundary and $q0$, $q1$, to $q2$ are samples on the other side of the block boundary. The condition is checked at two lines across of the 4 sample part of the boundary, line 0 and 3, and if both conditions are fulfilled, then the luma samples are deblocked for that 4 sample part of the boundary. This is applied for all 4 sample parts of a boundary until all samples of the block boundary have been checked and possibly filtered. Chroma boundaries may always be filtered if one any of the neighboring blocks are intra coded.

In the specification for VVC, a coding tree unit (CTU) is similar to the CTU in HEVC with the difference that the CTU in H.266 has a size of 128×128 luma samples. In VVC, the CTU can be split more flexibly such that a resulting CUs may consist of a rectangular luma block. In VVC, there is no prediction tree or transform tree as in HEVC. However, a CU in VVC can be divided into a multiple of TUs or into a multiple of prediction subblocks.

The output from the prediction decoding stage is the three components Y, Cb and Cr. However, it is possible to further improve the fidelity of these components, and this is done in the loop filtering stage. The loop filtering stage in VVC consists of three sub-stages; a deblocking filter sub-stage, a sample adaptive offset filter (SAO) sub-stage, and an adaptive loop filter (ALF) sub-stage. In the deblocking filter sub-stage, the decoder changes Y, Cb and Cr by smoothing edges near block boundaries when certain conditions are met. This increases perceptual quality (subjective quality) since the human visual system is very good at detecting regular edges such as block artifacts along block boundaries. In the SAO sub-stage, the decoder adds or subtracts a signaled value to or from samples that meet certain conditions, such as being in a certain value range (band offset SAO) or having a specific neighborhood (edge offset SAO). This can reduce ringing noise since such noise often aggregates in a certain value range or in specific neighborhoods (e.g., in a local maxima). In this disclosure, the reconstructed image components that are the result of this sub-stage may be referred as YSAO, CbSAO, and CrSAO.

In VVC, the deblocking is applied on an 4×4 grid for CUs first on vertical boundaries (CU/implicit TU/prediction sub-block boundaries) and then on horizontal boundaries (CU/implicit TU/prediction sub-blocks). Prediction sub-block boundaries inside a CU are filtered on an 8×8 grid. The deblocking is based on HEVC deblocking but also have longer deblocking filters if the size orthogonal to the block boundary is equal to or larger than 32 on at least one side for luma and the other side is larger than 4, modifying at most 7 samples (reading at most 8 samples), if the size orthogonal to the block boundary is less than 32 for one side for luma it modifies at most 3 samples and reading at most 4 samples on that side, and if it is equal to or larger than 8 on both side of a boundary in chroma samples for chroma modifying at most 3 chroma samples and reading at most 4 chroma samples otherwise it modifies at most one sample and reading at most two samples on respective side of the boundary.

In JVET, neural-network (NN) has been used to replace deblocking and can achieve significant rate savings objectively, i.e., in terms of calculated Bjontegaard (BD) rate. As an example, the JVET contribution JVET-X0066 described in EE1-1.6: Combined Test of EE1-1.2 and EE1-1.4, Y. Li, K. Zhang, L. Zhang, H. Wang, J. Chen, K. Reuze, A. M. Kotra, M. Karczewicz, JVET-X0066, October 2021 proposes a NN-based in-loop filter. The NN-based in-loop filter contains four NN models, one for intra luma signal, one for intra chroma signal, one for inter luma signal, and one for inter chroma signal. The NN-based in-loop filters use the information from the reconstructed samples, the prediction samples, the partition samples (if under all intra configuration), quantization parameter (QP), block boundary strength (BS). The deblocking filter in VVC is turned off in JVET-X0066.

SUMMARY

Certain challenges exist for using the NN-based filtering. Due to relatively high complexity of the NN and that the NN-based filtering is generally run at least once for each QP (e.g., QP, QP-5, or QP-10), and thus the NN-based filtering should be run several times during normal operation, the time it takes to perform an encoding process or a decoding process, which includes the NN-based filtering is long. For example, as described in EE1-1.6: Combined Test of EE1-1.2 and EE1-1.4, Y. Li, K. Zhang, L. Zhang, H. Wang, J. Chen, K. Reuze, A. M. Kotra, M. Karczewicz, JVET-X0066, October 2021, the time it takes to perform an encoding process which uses JVET-X0066 software is 181% of the time it takes to perform an encoding process without the NN-based filtering.

Accordingly, in one aspect, there is provided a method. The method comprises obtaining a weighting factor and obtaining input sample values. The method further comprises determining neural network, NN, filtered sample values by providing the input sample values to a neural network and determining revised sample values based on (i) the weighting factor and (ii) the NN filtered sample values.

In another aspect, there is provided a computer program comprising instructions which when executed by processing circuitry cause the processing circuitry to perform the method of any one of embodiments above.

In another aspect, there is provided an apparatus, the apparatus being configured to obtain a weighting factor and obtain input sample values. The apparatus is further configured to determine neural network, NN, filtered sample values by providing the input sample values to a neural network; and determine revised sample values based on (i) the weighting factor and (ii) the NN filtered sample values.

In another aspect, there is provided an apparatus. The apparatus comprises a memory and processing circuitry coupled to the memory, wherein the apparatus is configured to perform the method of any one of the embodiments described above.

The embodiments of this disclosure allow reducing the length of the time it takes to perform the encoding/decoding process which includes the NN-based filtering. Furthermore, the embodiments may reduce the amount of block artifacts and artificial edges as compared to the conventional NN-based filtering.

BRIEF DESCRIPTION OF THE DRAWINGS

The accompanying drawings, which are incorporated herein and form part of the specification, illustrate various embodiments.

DETAILED DESCRIPTION

Figure 1:
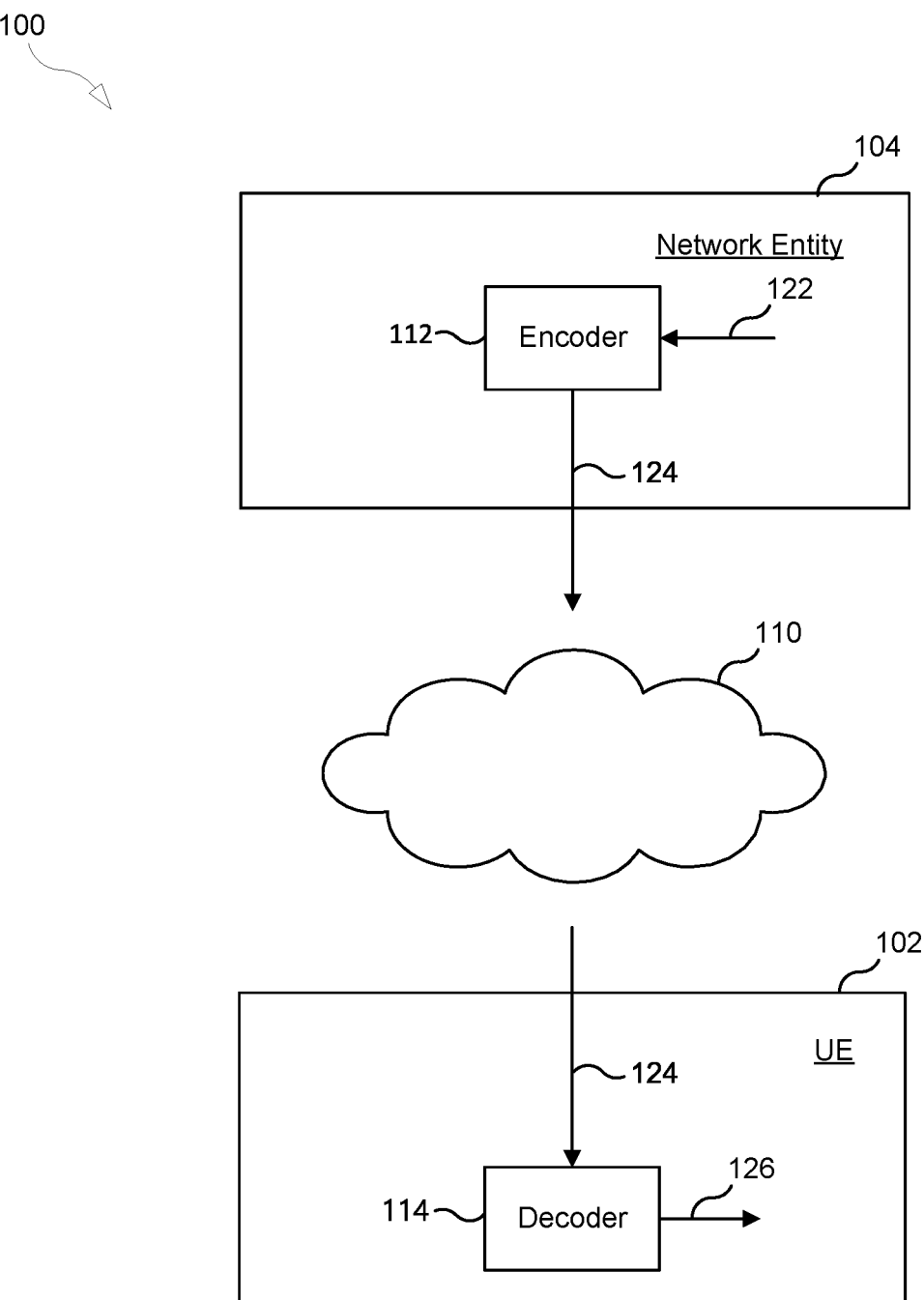
FIG. 1 shows a system according to some embodiments.

FIG. 1 shows a system 100 according to some embodiments. The system 100 comprises a user equipment (UE) 102, a network entity 104, and a network 110. The UE 102 is any of a desktop, a laptop, a tablet, a mobile phone, or any other computing device. The network entity 104 is any computing device (e.g., a server) capable of transmitting a video stream towards the UE 102 via the network 110. For example, the network entity 104 is a content providing server configured to store various video contents and send the video contents towards UEs. In another example, the network entity 104 is a content delivery server that is capable of obtaining various video contents from a content storage entity and delivering the video contents to UEs. The network entity 104 may be a single physical entity or a combination of multiple physical entities. The multiple physical entities may be located in the same location or may be distributed in a cloud.

As shown in FIG. 1, the network entity 104 includes an encoder 112. The encoder 112 is configured to encode a source video 122, thereby generating a video stream 124 (i.e., an encoded video). The video stream (a.k.a., bitstream)

124 may be a compressed version of the source video 122. After generating the bitstream 124, the network entity 104 may be configured to transmit towards the UE 102 the bitstream 124.

The UE 102 includes a decoder 114. The decoder 114 is configured to decode the bitstream 124 received at the UE 102, thereby generating a decoded video 126.

Figure 2:
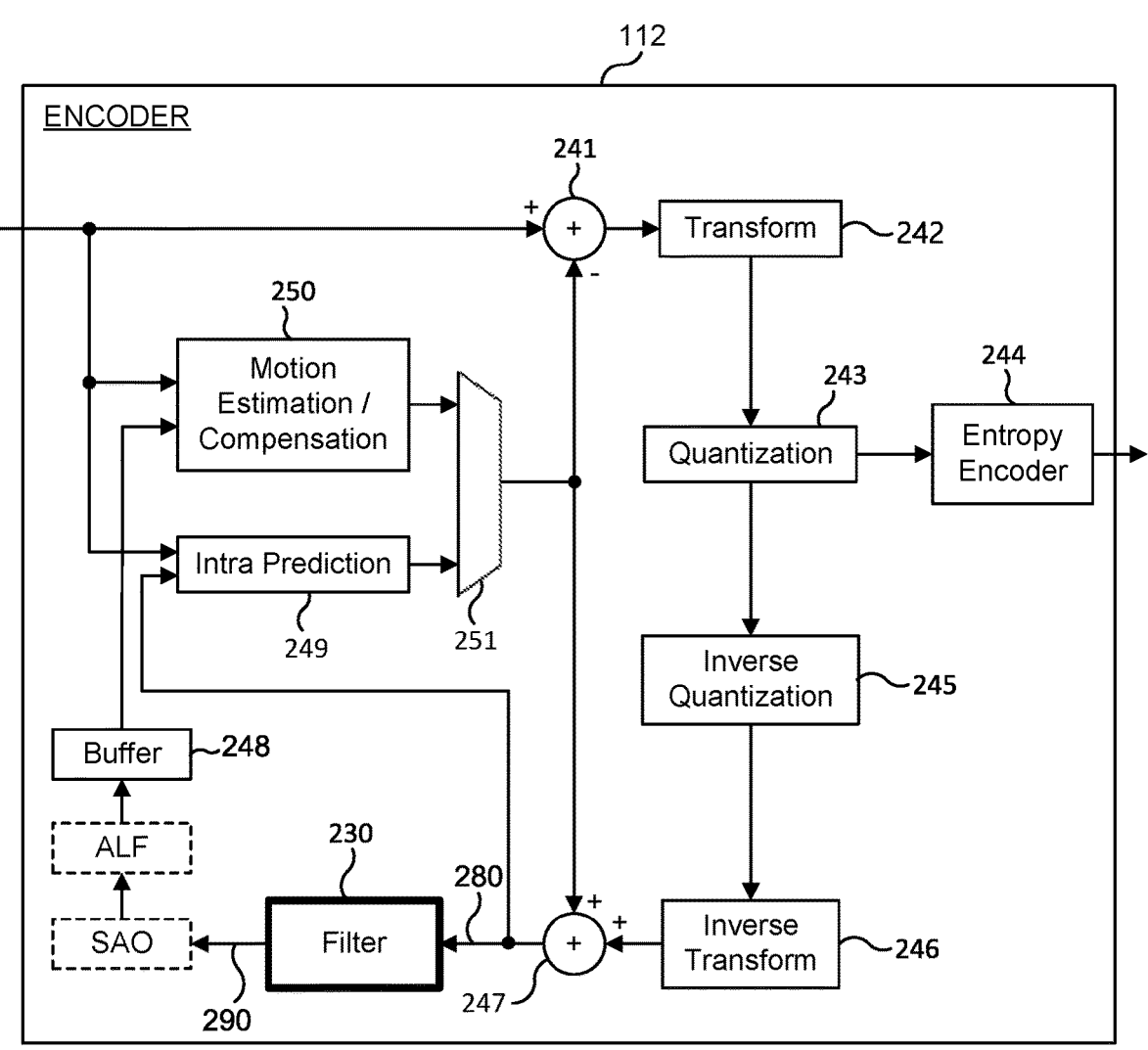
FIG. 2 shows an encoder according to some embodiments.

FIG. 2 shows a schematic block diagram of the encoder 112 according to some embodiments. The encoder 112 is configured to encode a block of pixel values (hereafter "block") in a video frame of the source video 122. In the encoder 102, a current block (e.g., a block included in a video frame of the source video 112) is predicted by performing a motion estimation by a motion estimator 250 from an already provided block in the same frame or in a previous frame. The result of the motion estimation is a motion or displacement vector associated with the reference block, in the case of inter prediction. The motion vector is utilized by the motion compensator 250 for outputting an inter prediction of the block. An intra predictor 249 computes an intra prediction of the current block. The outputs from the motion estimator/compensator 250 and the intra predictor 249 are input in a selector 251 that either selects intra prediction or inter prediction for the current block. The output from the selector 251 is input to an error calculator in the form of an adder 241 that also receives the pixel values of the current block. The adder 241 calculates and outputs a residual error as the difference in pixel values between the block and its prediction. The error is transformed in a transformer 242, such as by a discrete cosine transform, and quantized by a quantizer 243 followed by coding in an encoder 244, such as by entropy encoder. In inter coding, the estimated motion vector is brought to the encoder 244 for generating the coded representation of the current block. The transformed and quantized residual error for the current block is also provided to an inverse quantizer 245 and inverse transformer 246 to retrieve the original residual error. This error is added by an adder 247 to the block prediction output from the motion compensator 250 or the intra predictor 249 to create a reconstructed sample block 280 that can be used in the prediction and coding of a next block. The reconstructed sample block 280 is processed by a filter unit 230 according to the embodiments in order to perform filtering to combat any blocking artifact. The output from the filter unit 230, i.e., the output data 290, is then temporarily stored in a frame buffer 248, where it is available to the intra predictor 249 and the motion estimator/compensator 250.

Figure 3:
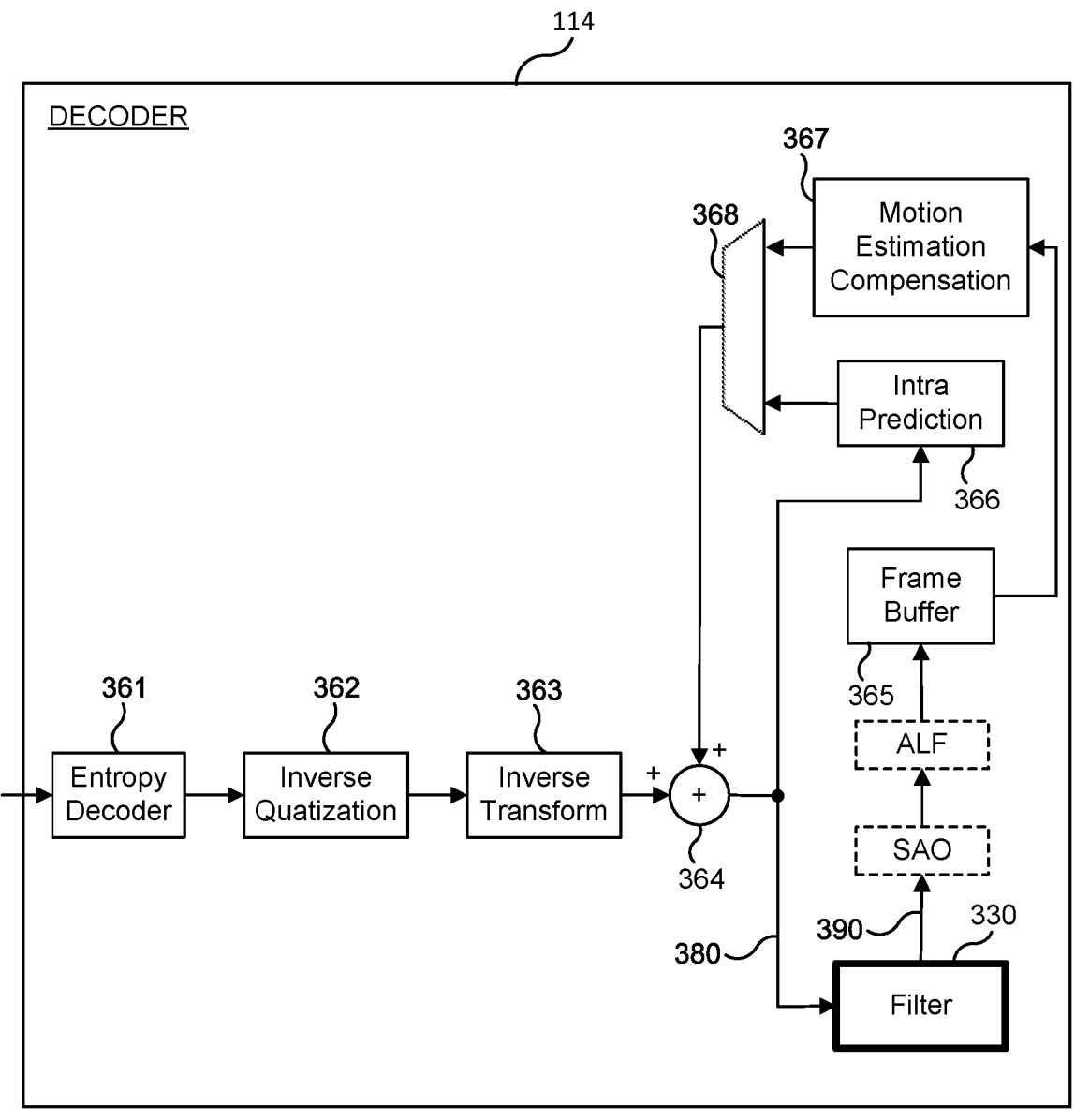
FIG. 3 shows a decoder according to some embodiments.

FIG. 3 is a schematic block diagram of the decoder 114 according to some embodiments. The decoder 114 comprises a decoder 361, such as entropy decoder, for decoding an encoded representation of a block to get a set of quantized and transformed residual errors. These residual errors are dequantized in an inverse quantizer 362 and inverse transformed by an inverse transformer 363 to get a set of residual errors. These residual errors are added in an adder 364 to the pixel values of a reference block. The reference block is determined by a motion estimator/compensator 367 or intra predictor 366, depending on whether inter or intra prediction is performed. A selector 368 is thereby interconnected to the adder 364 and the motion estimator/compensator 367 and the intra predictor 366. The resulting decoded block 380 output form the adder 364 is input to a filter unit 330 according to the embodiments in order to filter any blocking artifacts. The filtered block 390 is output form the filter 330 and is furthermore preferably temporarily provided to a frame buffer 365 and can be used as a reference block for a subsequent block to be decoded. The frame buffer (e.g., decoded picture buffer (DPB)) 365 is thereby connected to the motion estimator/compensator 367 to make the stored blocks of pixels available to the motion estimator/compensator 367. The output from the adder 364 is preferably also input to the intra predictor 366 to be used as an unfiltered reference block.

Figure 4:
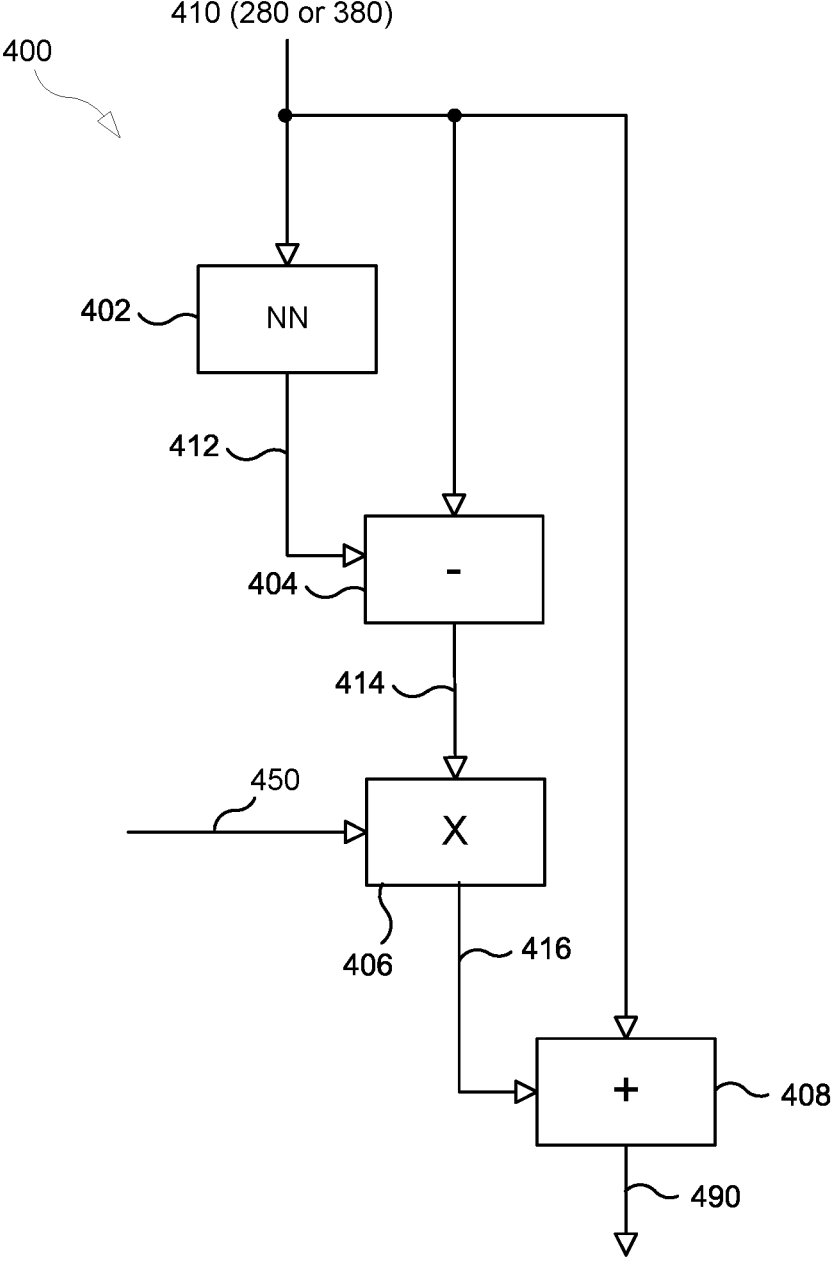
FIG. 4 shows a filter according to some embodiments.

FIG. 4 shows an example of a filter 400 for implementing the filter 230 or 330 according to some embodiments. The filter 400 comprises a NN 402, a first combiner 404, a weight multiplier 406, and a second combiner 408. Even though FIG. 4 shows that the NN 402, the first combiner 404, the weight multiplier 406, and the second combiner 408 are separate entities, in some embodiments, there are included in one single entity. Also each of the NN 402, the first combiner 404, the weight multiplier 406, and the second combiner 408 may be a software entity or a hardware entity.

The NN 402 is configured to receive input sample values 410 (corresponding to the data 280 or 380 shown in FIGS. 2 and 3) ("r"), generate NN filtered sample values 412 ("nn"), and provide the generated NN filtered sample values 412 to the first combiner 404.

The first combiner 404 is configured to calculate a difference between each of the NN filtered sample values 412 and each of the sample values 410, thereby outputting difference values 414 (nn−r) to the weight multiplier 406. The weight multiplier 406 is configured to multiply a weight value 450 ("w") to the difference values 414, thereby outputting weighted difference values 416 (w*(nn−r)) towards the second combiner 408. Examples of the weight value 450 include 1.0, 0.75, and 0.5. In some embodiments, the weight value 450 can be defined with 8-bit accuracy. In such embodiments, 1.0 corresponds to 256, 0.75 corresponds to 192, and 0.5 corresponds to 128. In some embodiments, the weighting is performed in fixed point arithmetic where a rounding offset value may be added to the weighted difference values 416 and the result is then right shifted by 8 (corresponds to division by 256 with 8-bit accuracy). In such embodiments, the weighted difference values 416 may be (w*(nn−r)+128)>>8. More generally written in N-bit accuracy as (w*(nn−r)+(1<<(N−1))>>N), where (1<<(N−1)) is the rounding offset.

The second combiner 408 is configured to add the weighted difference values 416 and the sample values 410, thereby outputting weaker NN filtered sample values 490 (corresponding to the data 290 or 390 shown in FIGS. 2 and 3) (rnn=r+w*(nn−r) or rnn=r+(w*(nn−r)+128)>>8). The filtered sample values 490 may be stored in the buffer 248 or 365. In case the ALF and the SAO are included in the encoder 112 and the decoder 114, the filtered sample values 490 may be provided to the SAO or the ALF.

Figure 5:
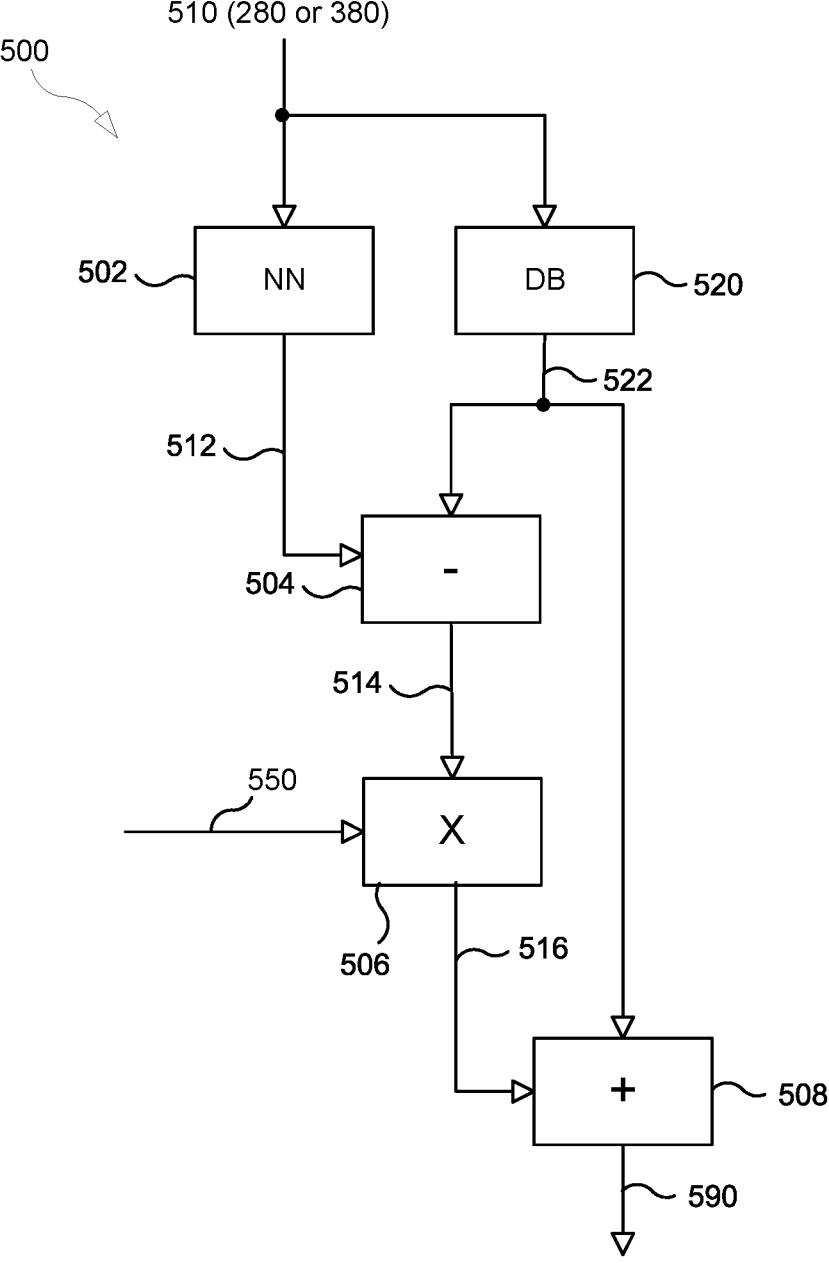
FIG. 5 shows a filter according to some embodiments.

FIG. 5 shows an example of a filter 500 for implementing the filter 230 or 330 according to some embodiments. The filter 500 comprises a NN 502, a deblocking filter unit 520, a first combiner 504, a weight multiplier 506, and a second combiner 508. Even though FIG. 5 shows that the NN 502, the deblocking filter unit 520, the first combiner 504, the weight multiplier 506, and the second combiner 508 are separate entities, in some embodiments, there are included in one single entity. Also each of the NN 502, the deblocking filter unit 520, the first combiner 504, the weight multiplier 506, and the second combiner 508 may be a software entity or a hardware entity.

The NN 502 is configured to receive input sample values 510 (corresponding to the data 280 or 380 shown in FIGS. 2 and 3) ("r"), generate NN filtered sample values 512 ("nn"), and provide the generated NN filtered sample values 512 to the first combiner 504.

The deblocking filter unit 520 is configured receive the input sample values 510, generate deblocked sample values 522 ("df"), and provide the deblocked sample values 522 to the first combiner 504.

The first combiner 504 is configured to calculate a difference between each of the NN filtered sample values 512 and each of the deblocked sample values 522, thereby outputting difference values 514 (nn–df) to the weight multiplier 506. The weight multiplier 506 is configured to multiply a weight value 550 ("w") to the difference values 514, thereby outputting weighted difference values 516 (w*(nn–df)) towards the second combiner 508. In some embodiments, the weighting is performed in fixed point arithmetic where a rounding offset value may be added to the weighted difference values 516 and the result is then righty shifted by 8. In such embodiments, the weighted difference values 516 may be (w*(nn–df)+128)>>8. In some embodiments, the multiplication is performed in fixed point arithmetic with N-bit accuracy where the multiplication with the weight value 550 also includes the rounding offset value and a right shift value, e.g., (w*(nn–df)+(1<<(N–1)))>>N, where 1<<(N–1) is the rounding offset value and N is the right shift value.

The second combiner 508 is configured to add the weighted difference values 516 and the deblocked sample values 522, thereby outputting weaker NN filtered sample values 590 (corresponding to the data 290 or 390 shown in FIGS. 2 and 3) (dfnn=df+w*(nn–df) or dfnn=df+(w*(nn–df)+128)). The filtered sample values 590 may be stored in the buffer 248 or 365. In case the ALF and the SAO are included in the encoder 112 and the decoder 114, the filtered sample values 590 may be provided to the SAO or the ALF.

As discussed above, examples of the weight value 450 include 1.0, 0.75, and 0.5. In some embodiments, the weight value 450 can be defined with 8-bit accuracy, and thus 1.0 corresponds to 256, 0.75 corresponds to 192, and 0.5 corresponds to 128. In such embodiments, the weaker NN filtered sample values 590 (rnn) may be written as dfnn=df+(192*(nn–df)+128)>>8, where 128 is a rounding offset value.

Figure 6:
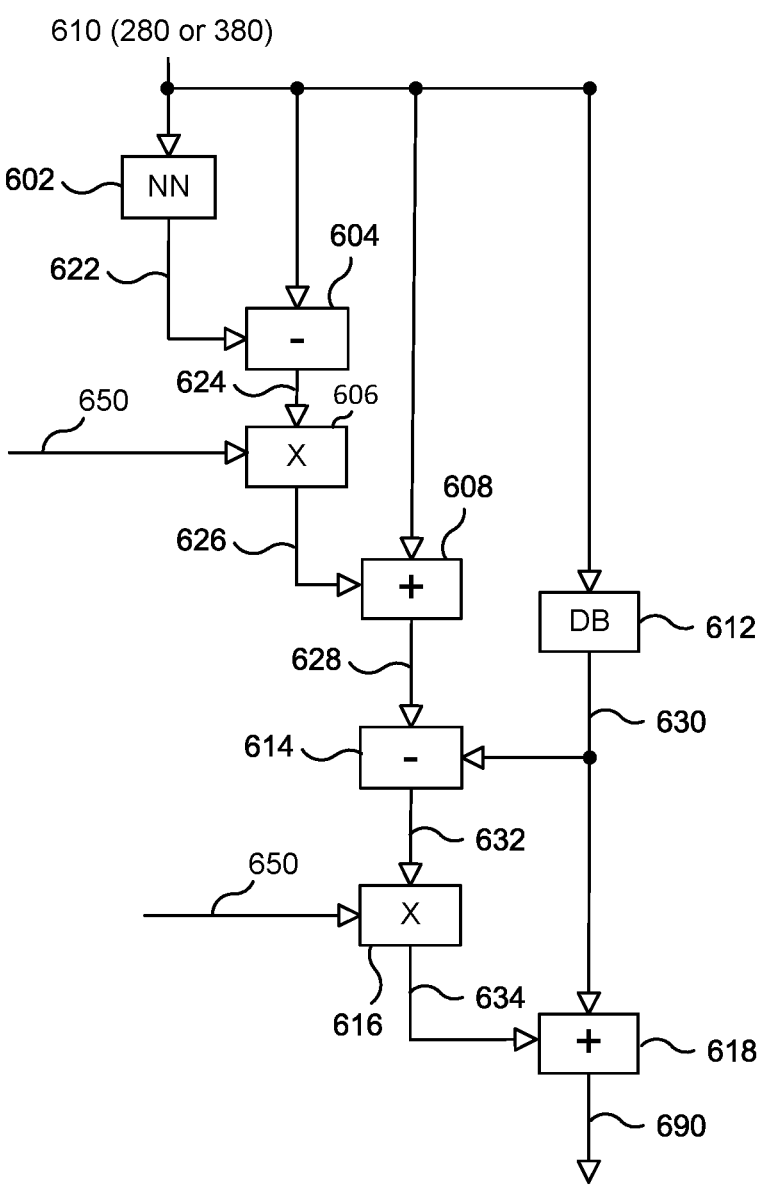
FIG. 6 shows a filter according to some embodiments.

FIG. 6 shows an example of a filter 600 for implementing the filter 230 or 330 according to some embodiments. The filter 600 comprises a NN 602, a first combiner 604, a weight multiplier 606, a second combiner 608, a deblocking filter unit 612, a third combiner 614, a scaler multiplier 616, and a fourth combiner 618. Even though FIG. 6 shows that the elements 602-618 are separate entities, in some embodiments, there are included in one single entity. Also each of the elements 602-618 may be a software entity or a hardware entity.

The NN 602 is configured to receive input sample values 610 (corresponding to the data 280 or 380 shown in FIGS. 2 and 3) ("r"), generate NN filtered sample values 622 ("nn"), and provide the generated NN filtered sample values 622 to the first combiner 604. The first combiner 604 is configured to calculate a difference between each of the NN filtered sample values 622 and each of the sample values 610, thereby outputting difference values 624 (nn–r) to the weight multiplier 606. The weight multiplier 606 is configured to multiply a weight value 650 ("w") to the difference values 624, thereby outputting weighted difference values 626 (w*(nn–r)) towards the second combiner 608.

The second combiner 608 is configured to add the weighted difference values 626 and the sample values 610, thereby outputting filtered sample values 628 (rnn=r+w*(nn–r)) towards the third combiner 614.

The deblocking filter unit 612 is configured to receive the sample values 610 and generate deblocked sample values 630 (*df*) based on the sample values 610. The third combiner 614 is configured to receive the filtered sample values 628 (rnn) and the deblocked sample values 630 (df), and calculate a difference 632 (rnn–df) between each of the filtered sample values 628 and each of the deblocked sample values 630. The third combiner 614 may provide the difference values 632 (rnn–df) towards the scaler multiplier 616.

The scaler multiplier 616 is configured to multiply the difference values 632 by a scaler value 650 (s), thereby generating scaled sample values 634 (s*(rnn–df)) which are provided to the fourth combiner 618. In some embodiments, the scaler value 650 is indicated in the bitstream the UE 102 received from the network entity 104.

The fourth combiner 618 is configured to combine the scaled sample values 634 (s*(rnn–df)) and the deblocked sample values 630 (*df*), thereby generating weaker NN filtered sample values 690 (corresponding to the data 290 or 390 shown in FIGS. 2 and 3) (df+s*(rnn–df)). The filtered sample values 690 may be stored in the buffer 248 or 365. In case the ALF and the SAO are included in the encoder 112 and the decoder 114, the filtered sample values 690 may be provided to the SAO or the ALF.

In some embodiments, the weight factor 450/550/650 is implicitly or explicitly provided in the bitstream the UE 102 received from the network entity 104. For example, the bitstream the UE transmitted towards the network entity 14 may include a weight flag indicating to the decoder 104 that a weight value to be used as the weight factor 450 for decoding is included in the bitstream or a default weight value (that is known to the decoder 104 before receiving the bitstream) should be used as the weight factor 450/550/650 for decoding.

In some embodiments, instead of including (e.g., encoding) a weight value that is to be used as the weight factor 450 in the bitstream directly, the bitstream may include a weight adjusting value. The weight adjusting value is used to calculate the weight factor 450/550/650. For example, the weight factor may be calculated based on a difference between a maximum weight value (that is known to the decoder 104 before receiving the bitstream) and the weight adjusting value (e.g., $W_{max}$–W adjusting value).

In one example, the weight adjusting value is encoded with an 8-bit accuracy. In such example, the weight factor 450/550/650 may be calculated based on 256 (which is the maximum weight value) minus the 8-bit representation of the weight adjusting value.

In some embodiments, instead of using the maximum weight value, a reference weight value that is not the maximum weight value may be used to calculate the weight factor 450/550/650. For example, the weight factor 450/550/650 may be calculated based on a difference between (the maximum weight value–1) and the weight adjusting value. Thus, in case the maximum weight value is 256, the reference weight value would be 255. In such case, if a desired weight value is 255, the weight adjusting value would be 0.

Referring back to FIGS. 2 and 3, as discussed above, the QP for a block may be one of the input parameters for the NN (e.g., 402, 502, or 602). In some embodiments, the QP is determined by a QP offset parameter. The QP offset parameter may be specific to a certain sequence, picture, or slice. For example, the QP offset parameter may be specific for intra and inter coded pictures and/or color components such as luma and chroma. The QP offset parameter may be provided in a sequence parameter set (SPS), a picture parameter set (PPS), a picture header, or a slice header of a video bitstream.

There are different ways of calculating the QP using the QP offset parameter. For example, if a slice QP is 37 and the QP offset parameter is −2, the QP input to the NN may be calculated as 37−2 which is equal to 35.

In some embodiments, the encoder 112 may provide to the decoder 114 a block flag indicating whether the deblocking filtering alone should be used for decoding of the block or whether the deblocking filtering combined with the NN-based filtering should be used for decoding of the block. Since, as discussed above, the weight factor 450 may be set per a block, in these embodiments, the local control of the strength of the NN-based filtering is enabled.

Examples of the size of each block are 256×256, 128×128, 64×64, and 32×32.

In some embodiments, the size of the input block to the NN may be greater than the size of the block used for the local control. This size difference may be beneficial since the size of the input samples of the NN-based filtering is typically greater than the size of the output samples of the NN-based filtering which means that the overhead for NN filtering is greater for small block sizes. For example, if the size of the input block is 256×256 and the size of the control block is 128×128, then the control block may use the deblocking filtering alone for some of the regions of the input block while using the deblocking filtering combined with the NN-based filtering for other regions of the input block.

In some embodiments, the NN filtering strength may be controlled for inter pictures such that the maximum input size (not counting border extension) to the NN filter is restricted to a specified size. The restriction can apply to luma or chroma separately. The size can either be implicitly or explicitly provided in the bitstream. One exemplary restriction is not to use a size greater than 128×128 for luma in inter pictures. Another exemplary restriction is not to use a size greater than 128×128 for luma in inter pictures in low-delay coding conditions such as video-conferencing. Another exemplary restriction is not to use a size greater than 128×128 for luma in inter pictures for resolutions below 4K. Another example is to align the max size with the CTU size used. For example, if the CTU size is 256×256, the max block size is also 256×256 (excluding border extension for input to NN). If the CTU size is 128×128 the max block size is also 128×128.

In some embodiments, there are provided various slice modes in which the encoder 102 and/or the decoder 104 selectively uses the deblocking filtering in combination with the NN-based filtering with different weight values. In such embodiments, the encoder 102 selects a slice mode from various slice modes and uses the selected slice mode for encoding. Also the encoder 102 may signal the selected slice mode to the decoder 104 such that the decoder 104 can use the selected slice mode for decoding. Each slice mode may be defined as follows:

Slice Mode 0: In this mode, the filter 230/330 does not use the NN-based filtering but only uses the deblocking filtering for its filtering operation. The filter 230/330 performs a deblocking filtering on the input sample values 280/380, thereby generating the output sample values 290/390. The output sample values 290/390 are for the whole slice.

Slice Mode 1: In this mode, the filter 230/330 uses the NN-based filtering as well as the deblocking filtering for its filtering operation. The way the NN-based filtering and the deblocking filtering are used together are described above with respect to FIGS. 4-6. As discussed above, the bitstream the decoder 114 receives from the encoder 112 may include a weight flag indicating whether an actual weight value to be used for decoding is included in the bitstream or whether a default weight value should be used as the weight factor. As further discussed above, the bitstream may include a weight adjusting value instead of the actual weight value. In such case, the decoder 114 may calculate the actual weight value to be used as the weight factor based on the weight adjusting value and the maximum weight value that is known to the decoder 114 (e.g., 1.0). In one example, the adjusting weight value may be coded with 8 bits. In such example, the adjusting weight value may be any value between 0 and 255. In this mode, like the mode 0, the output sample values 290/390 are for the whole slice.

Slice Mode 2: Like the mode 1, in this mode, the filter 230/330 uses the NN-based filtering as well as the deblocking filtering for its filtering operation. But unlike the mode 1 where the default weight value is 1 (256), in this mode, the default weight value is 0.75 (192). Also unlike the mode 1 where the actual weight value or the weight adjusting value is signaled in case the default weight value is not used, in this mode, the actual weight value or the weight adjusting value is not signaled. In other words, in this mode, the NN-based filtering and the deblocking filtering are combined using the default weight value of 0.75 (192). In this mode, like the modes 0 and 1, the output sample values 290/390 are for the whole slice.

Slice Mode 3: This mode is identical to the mode 2 except for that the default weight value is 0.5 (128) instead of 0.75 (192).

Slice Mode 4: In this mode, the bitstream the decoder 114 receives from the encoder includes a block flag indicating whether, for the filter 230/330's filtering operation, the deblocking filtering alone should be used or the deblocking filtering combined with the NN-based filtering should be used. Also, as discussed above, the bitstream may also include a weight flag indicating whether an actual weight value is included in the bitstream or whether a default weight value should be used as the weight factor. As further discussed above, the bitstream may include a weight adjusting value instead of the actual weight value. In such case, the decoder 104 may calculate the actual weight value to be used as the weight factor based on the weight adjusting value and the maximum weight value that is known to the decoder 114 (e.g., 1.0). In one example, the adjusting weight value may be coded with 8 bits. In such example, the adjusting weight value may be any value between 0 and 255. In this mode, unlike the modes 0-3, the output sample values 290/390 are for the whole block.

Slice Mode 5: This mode is identical to the mode 4 except for that in case the deblocking filtering combined with the NN-based filtering is used for decoding, the weight value used for decoding is always the default weight value of 0.75. Thus, in this mode, the weight flag is not needed.

Slice Mode 6: This mode is identical to the mode 5 except for that the default weight value is 0.5.

As discussed above, the encoder 112 is configured to determine which slice mode to use for encoding and include the determined slice mode in the bitstream to be delivered to the decoder 114. Depending on the determined slice mode, the encoder 112 may also include a weight value in the bitstream unless a default weight value (e.g., 1.0, 0.75, or 0.5) is to be used for decoding.

In case any one of the slice modes 4-6 is selected, a mode flag may be coded for each block. The mode flag may indicate if the deblocking filtering should be used for the block for decoding or if the NN-based filtering combined with the deblocking filtering should be used for decoding.

From the received bitstream, the decoder 114 may determine the slice mode and the weight value (if it is included in the bitstream).

If slice mode equals 4, 5 or 6 a block level flag is also decoded for each block. If a block flag indicates that deblocking filtering should be used that block use samples after deblocking filtering otherwise if the block flag indicates that NN filtering combined with deblocking should be used such samples are outputted for the block In some embodiments, the maximum size of the block for luma in inter coded pictures for resolutions below 4K (e.g., less than the width of 3840) may be set to 128×128.

The performance of the embodiments compared to JVET-X0066 is as follows for Random Access (RA):

|  | Y-PSNR | U-PSNR | V-PSNR | EncT | DecT |
|---|---|---|---|---|---|
| Class A1 | −0.56% | −0.74% | −0.17% | 73% | 86% |
| Class A2 | −0.56% | −0.74% | −0.17% | 76% | 87% |
| Class B | −0.22% | −0.68% | −0.53% | 70% | 91% |
| Class C | −0.03% | −0.85% | −0.38% | 79% | 91% |
| Class E |  |  |  |  |  |
| Overall | −0.27% | −0.66% | −0.31% | 71% | 84% |
| Class D | −0.09% | −0.29% | 0.08% | 80% | 92% |

The performance of the embodiments compared to JVET-X0066 is as follows for Low Delay B (LDB):

|  | Y-PSNR | U-PSNR | V-PSNR | EncT | DecT |
|---|---|---|---|---|---|
| Class A1 | #VALUE! | #VALUE! | #VALUE! | #DIV/0! | #DIV/0! |
| Class A2 | #VALUE! | #VALUE! | #VALUE! | #DIV/0! | #DIV/0! |
| Class B | −0.52% | −2.57% | −2.16% | 74% | 86% |
| Class C | −0.21% | −1.59% | −0.89% | 75% | 82% |
| Class E | −1.62% | −4.27% | −3.89% | 62% | 81% |
| Overall | −0.69% | −2.13% | −1.60% | 71% | 84% |
| Class D | −0.14% | −1.42% | −1.11% | 82% | 93% |

Where Class A1 and class A2 are 4K (3840×2160), Class B is full HD (1920×1080), Class C has the resolution of 832×480, Class E has the resolution of 1280×720, and Class D has the resolution of 416×240. A negative number corresponds to bitrate reduction at the same PSNR compared to the reference. Encoding and decoding time below 100% corresponds to speed-up compared to anchor.

In some embodiments, for a slice or a picture, an optimal weight value to be used as the weight factor 450/550/650 can be selected. One way of selecting the optimal weight value is described below.

First, samples included in one or more blocks are filtered by (1) the NN-based filtering alone and/or the deblocking filtering alone and (2) the combination of the deblocking filtering and the NN-based filtering. The filtering (2)—i.e., the combination of the NN-based filtering and the deblocking filtering-is performed using a predetermined weight value (e.g., 0.5) as the weight factor 450/550/650.

Then each of the values of samples that went through the filtering (1) and the values of samples that went through the filtering (2) are compared with the original sample values in order to identify the filtered samples that are closest to the original samples. For example, a sum of absolute differences (SAD) or a sum of squared differences (SSD) between the original samples and the filtered samples obtained via the filtering (1) are calculated and a SAD or a SSD between the original samples and the filtered samples values obtained via the filtering (2) are calculated. Then, the filtered samples that produce the minimum SAD or the minimum SSD (i.e., the samples resulting in the least distortion) are identified.

The optimal weight value is selected such that the selected optimal weight value minimizes the SAD or the SSD between the original sample values and the values of the identified samples after the identified samples go through the filtering (1 or 2). By determining the optimal weight value this way, it is possible to find a weight value that performs better locally as compared to the weight value that produces the least SAD or the SSD between all original sample values in a picture or a slice and all filtered sample values in a picture or a slice.

Once the optimal weight value is determined, the filter 230 may use the optimal weight value to perform its filtering operation on a respective block using the NN-based filtering in combination with the deblocking filtering. The result of this filtering operation is compared with the result of a filtering operation which only comprises the deblocking filtering.

Based on the comparison of the results, the encoder 112 may determine whether to use the deblocking filtering alone for the filter 230's operation or the deblocking filtering in combination with the NN-based filtering for the filter 230's operation. This corresponds to the slice modes 4-6 described above. In case the encoder 112 signals the decoder 114 either the default weight value of 1 or a non-default weight value to be used as the weight factor 450/550/650 for decoding, this mode corresponds to the slice mode 4. On the contrary if the encoder 112 signals the decoder 114 that the default weight value of 0.75 or 0.5 should be used as the weight factor 450/550/650 for decoding, this mode corresponds to the slice mode 5 or 6.

In one embodiment, an additional weight flag and an additional coded weight may be included in the bitstream the UE 102 received from the network entity 104. In such embodiments, if the additional weight flag is 0, the deblocking filtering alone is used for decoding and if the additional weight flag is 1, the deblocking filtering combined with the NN-based filtering is used for decoding. Here, the deblocking filtering is combined with the NN-based filtering using the additional coded weight.

The above embodiment may be used as a new slice mode or an extension of the slice mode 4 discussed above. For example, when the additional weight flag is 0, the decoder 114 performs the decoding according to the slice mode 4 but when the additional weight flag is 1, the weight adjusting value of the slice mode 4 is used for a weighted combination of the deblocking filtering and the NN-based filtering for one block and the additional coded weight may be used for a weighted combination of the deblocking filtering and the NN-based filtering for another block.

Figure 7:
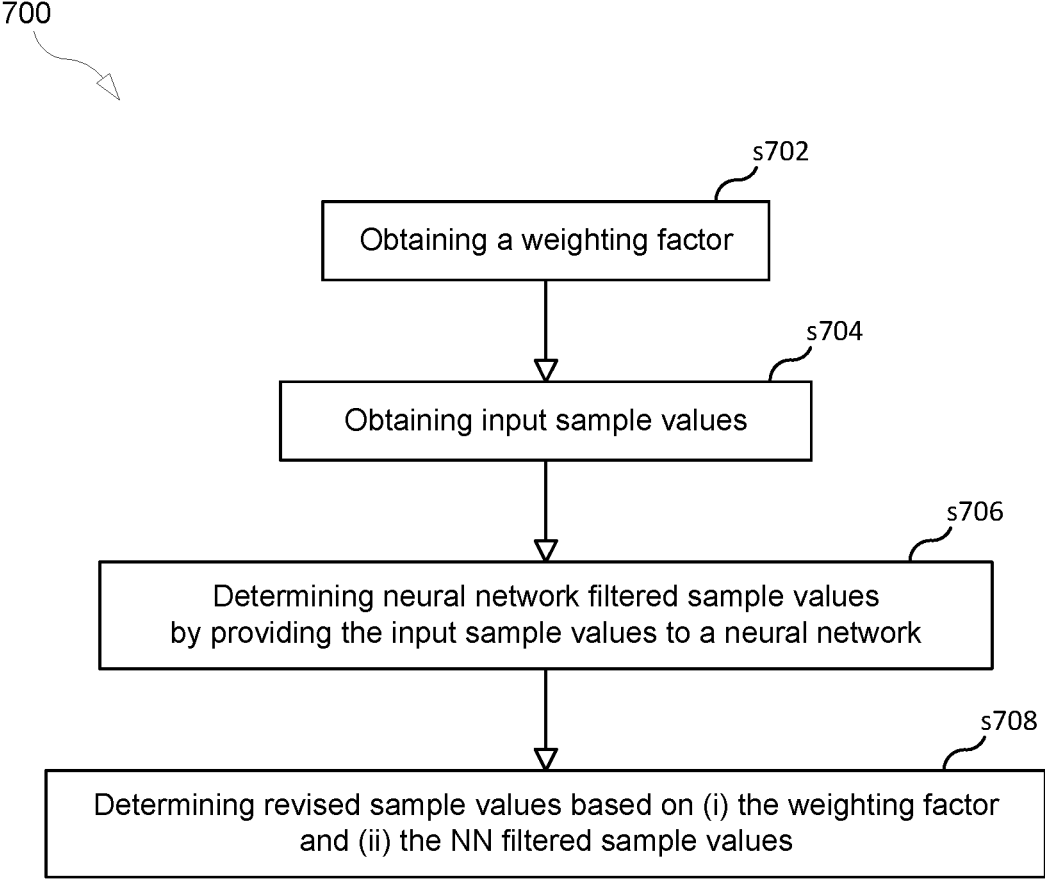
FIG. 7 shows a process 700 according to some embodiments.

FIG. 7 shows a process 700 according to some embodiments. The process 700 may begin with step s702. Step s702 comprises obtaining a weighting factor. Step s704 comprises obtaining input sample values. Step s706 comprises determining neural network (NN) filtered sample values by providing the input sample values to a neural network. Step s708 comprises determining revised sample values based on (i) the weighting factor and (ii) the NN filtered sample values.

In some embodiments, the input sample values are reconstructed sample values that are obtained based on a combination of predicted sample values and residual coded sample values.

In some embodiments, the input sample values are deblocked sample values that are obtained by applying a deblocking filtering to reconstructed sample values that are obtained based on a combination of predicted sample values and residual coded sample values.

In some embodiments, the revised sample values are determined based on differences between the input sample values and the NN filtered sample values.

In some embodiments, the method further comprises applying a deblocking filtering to the input sample values, thereby generating deblocked sample values (df), wherein the revised sample values are determined based on differences between the deblocked sample values and the NN filtered sample values.

In some embodiments, determining the revised sample values comprises: multiplying the weighting factor to (i) the differences between the input sample values and the NN filtered sample values or (ii) the differences between the deblocked sample values and the NN filtered sample values; and adding the result of the multiplication to the input sample values or the deblocked sample values.

In some embodiments, the method is performed by a decoder, and the method further comprises receiving a bitstream that comprises a mode indication value, wherein the mode indication value indicates whether (i) the weighting factor is indicated in the bitstream or (ii) a default weighting factor should be used as the weighting factor for decoding.

In some embodiments, the bitstream comprises a weight adjustment value. The method further comprises: determining that the mode indication value indicates that the weighting factor is indicated in the bitstream; and as a result of determining that the mode indication value indicates that the weighting factor is indicated in the bitstream, calculating the weighting factor based on a combination of a predetermined maximum weighting factor and the weight adjustment value.

In some embodiments, the method is performed by an encoder, and the method further comprises transmitting a bitstream that comprises a mode indication value, wherein the mode indication value indicates whether (i) the weighting factor is indicated in the bitstream or (ii) a default weighting factor should be used as the weighting factor for decoding.

In some embodiments, the method further comprises calculating a weight adjustment value based on a difference between a predetermined maximum weighting factor and the weighting factor, and the bitstream further comprises the weight adjustment value.

In some embodiments, the method further comprises providing the revised sample values to any one of an adaptive loop filter (ALF), a sample adaptive offset (SAO) filter, or a decoder picture buffer (DPB).

In some embodiments, the method further comprises applying a deblocking filtering to the input sample values, thereby generating deblocked sample values, calculating scaled differences between the revised sample values and the deblocked sample values; and determining further revised sample values based on the scaled differences and the deblocked sample values.

In some embodiments, the NN filtered sample values are determined further by providing a quantization parameter (QP) to the neural network.

In some embodiments, the QP is determined based on a default QP value for a block and an QP offset parameter, and the QP offset parameter is specific for intra coded pictures only, inter coded pictures only, or particular color components only.

In some embodiments, the QP is determined based on a sum of the default QP value for a block and the QP offset parameter.

In some embodiments, the method is performed by a decoder; the method further comprises receiving a bitstream including a block flag, and the block flag indicates whether the revised sample values are values of samples obtained via a deblocking filtering or a deblocking filtering in combination of an NN-based filtering.

In some embodiments, the method is performed by an encoder; the method further comprises transmitting a bitstream including a block flag, and the block flag indicates whether the revised sample values are values of samples obtained via a deblocking filtering or a deblocking filtering in combination of an NN-based filtering.

In some embodiments, the size of a block of samples inputted to the NN is restricted to be below a predefined maximum size, and the restriction is configured to be applied to luma samples and/or chroma samples.

In some embodiments, the restriction is configured to be applied to luma samples in inter pictures only.

In some embodiments, the method is performed by a decoder, and the method further comprises receiving a bitstream including a restriction value indicating the predefined maximum size.

In some embodiments, the method is performed by an encoder, and the method further comprises transmitting a bitstream including a restriction value indicating the predefined maximum size.

Figure 8:
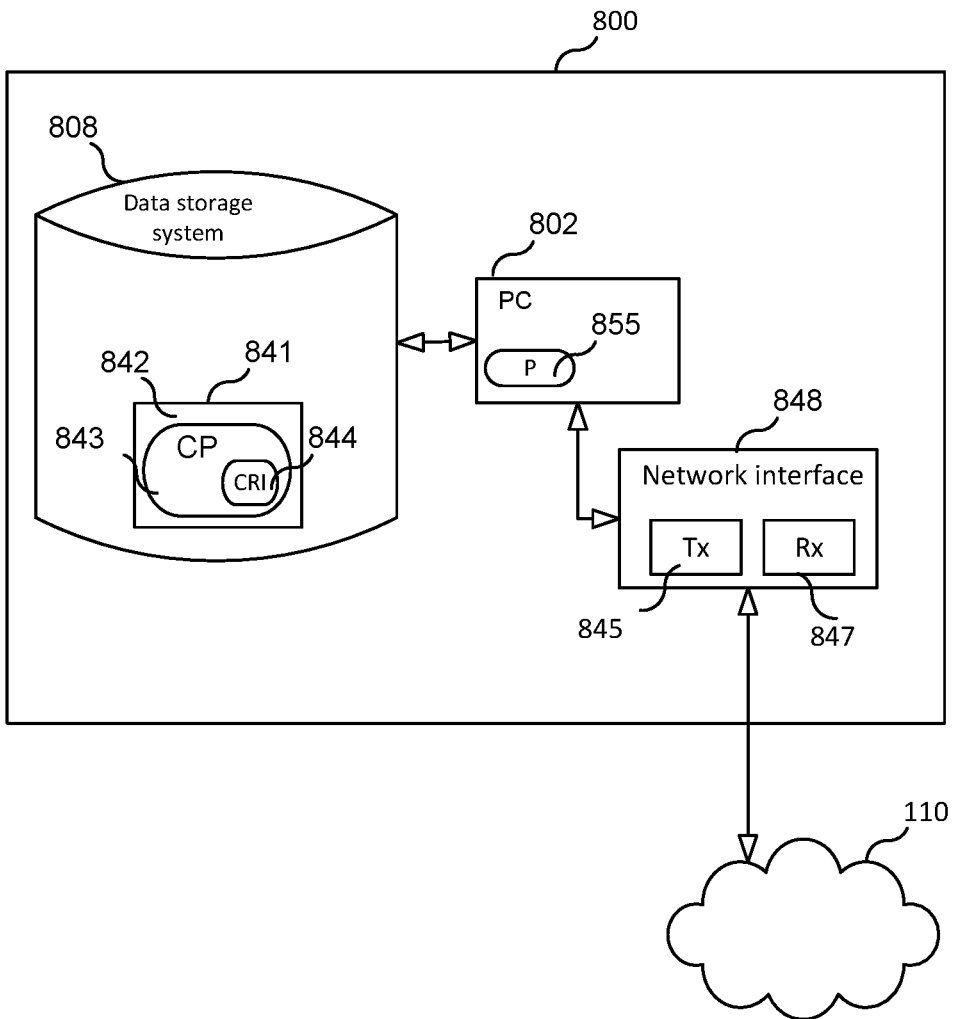
FIG. 8 shows an apparatus 800 according to some embodiments.

FIG. 8 is a block diagram of an apparatus 800 for implementing the encoder 112 and/or the decoder 114, according to some embodiments. When apparatus 800 implements a decoder, apparatus 800 may be referred to as a "decoding apparatus 800," and when apparatus 800 implements an encoder, apparatus 800 may be referred to as an "encoding apparatus 800." As shown in FIG. 8, apparatus 800 may comprise: processing circuitry (PC) 802, which may include one or more processors (P) 855 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 800 may be a distributed computing apparatus); at least one network interface 848 comprising a transmitter (Tx) 845 and a receiver (Rx) 847 for enabling apparatus 800 to transmit data to and receive data from other nodes connected to a network 110 (e.g., an Internet Protocol (IP) network) to which network interface 848 is connected (directly or indirectly) (e.g., network interface 848 may be wirelessly connected to the network 110, in which case network interface 848 is connected to an antenna arrangement); and a storage unit (a.k.a., "data storage system") 808, which may include one or more non-volatile storage devices and/or one or more volatile storage devices. In embodiments where PC 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, magnetic media (e.g., a hard disk), optical media, memory devices (e.g., random access memory, flash memory), and the like. In some embodiments, the CRI 844 of computer program 843 is configured such that when executed by PC 802, the CRI causes apparatus 800 to perform steps described herein (e.g., steps described herein with reference to the flow charts). In other embodiments, apparatus 800 may be configured to perform steps described herein without the need for code. That is, for example, PC 802 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a decoder, the method comprising:

receiving a bitstream that comprises a mode indication value, wherein the mode indication value indicates whether (i) a weighting factor is indicated in the bitstream or (ii) a default weighting factor should be used as the weighting factor for decoding;

obtaining the weighting factor;

obtaining reconstructed sample values that are obtained based on a combination of predicted sample values and residual coded sample values;

determining neural network (NN) filtered sample values by providing the reconstructed sample values to a neural network;

determining revised sample values based on (i) the weighting factor and (ii) the neural network filtered sample values; and applying a deblocking filtering to the reconstructed sample values, thereby generating deblocked reconstructed sample values, df, wherein determining the revised sample values comprises:

multiplying the weighting factor to (i) the differences between the reconstructed sample values and the neural network filtered sample values or (ii) the differences between the deblocked reconstructed sample values and the neural network filtered sample values; and adding the result of the multiplication to the reconstructed sample values or the deblocked reconstructed sample values.

2. The method of claim 1, wherein the bitstream comprises a weight adjustment value; and the method further comprises:

determining that the mode indication value indicates that the weighting factor is indicated in the bitstream;

as a result of determining that the mode indication value indicates that the weighting factor is indicated in the bitstream, calculating the weighting factor based on a combination of a predetermined maximum weighting factor and the weight adjustment value.

3. The method of claim 1, further comprising:

providing the revised sample values to any one of an adaptive loop filter, ALF, a sample adaptive offset, SAO, filter, or a decoder picture buffer, DPB.

4. The method of claim 1, further comprising:

calculating scaled differences between the revised sample values and the deblocked reconstructed sample values; and determining further revised sample values based on the scaled differences and the deblocked reconstructed sample values.

5. The method of claim 1, wherein the NN filtered sample values are determined further by providing a quantization parameter, QP, to the neural network.

6. The method of claim 5, wherein the QP is determined based on a default QP value for a block and an QP offset parameter, and the QP offset parameter is specific for intra coded pictures only, inter coded pictures only, or particular color components only.

7. The method of claim 6, wherein the QP is determined based on a sum of the default QP value for a block and the QP offset parameter.

8. The method of claim 1, wherein the method further comprises receiving a bitstream including a block flag, and the block flag indicates whether the revised sample values are values of samples obtained via a deblocking filtering or a deblocking filtering in combination of an NN-based filtering.

9. The method of claim 1, wherein the size of a block of samples inputted to the NN is restricted to be below a predefined maximum size, and the restriction is configured to be applied to luma samples and/or chroma samples.

10. The method of claim 9, wherein the restriction is configured to be applied to luma samples in inter pictures only.

11. The method of claim 9, wherein the method is performed by a decoder, and the method further comprises receiving a bitstream including a restriction value indicating the predefined maximum size.

12. The method of claim 9, wherein the method is performed by an encoder, and the method further comprises transmitting a bitstream including a restriction value indicating the predefined maximum size.

13. A method, performed by an encoder, the method comprising:

obtaining a weighting factor;

obtaining reconstructed sample values that are obtained based on a combination of predicted sample values and residual coded sample values;

determining neural network, NN, filtered sample values by providing the reconstructed sample values to a neural network;

determining revised sample values based on (i) the weighting factor and (ii) the NN filtered sample values;

applying a deblocking filtering to the reconstructed sample values, thereby generating deblocked reconstructed sample values, df; and transmitting a bitstream that comprises a mode indication value, wherein the mode indication value indicates whether (i) the weighting factor is indicated in the bitstream or (ii) a default weighting factor should be used as the weighting factor for decoding, wherein determining the revised sample values comprises:

multiplying the weighting factor to (i) the differences between the reconstructed sample values and the NN filtered sample values or (ii) the differences between the deblocked reconstructed sample values and the NN filtered sample values; and adding the result of the multiplication to the reconstructed sample values or the deblocked reconstructed sample values.

14. The method of claim 13, wherein the method further comprises calculating a weight adjustment value based on a difference between a predetermined maximum weighting factor and the weighting factor, and the bitstream further comprises the weight adjustment value.

15. The method of claim 13, wherein the method further comprises transmitting a bitstream including a block flag, and the block flag indicates whether the revised sample values are values of samples obtained via a deblocking filtering or a deblocking filtering in combination of an NN-based filtering.

16. The method of claim 13, further comprising:

providing the revised sample values to any one of an adaptive loop filter, ALF, a sample adaptive offset, SAO, filter, or a decoder picture buffer, DPB.

17. The method of claim 13, further comprising:

calculating scaled differences between the revised sample values and the deblocked reconstructed sample values; and determining further revised sample values based on the scaled differences and the deblocked reconstructed sample values.

18. The method of claim 13, wherein the NN filtered sample values are determined further by providing a quantization parameter, QP, to the neural network, the QP is determined based on a default QP value for a block and an QP offset parameter, the QP offset parameter is specific for intra coded pictures only, inter coded pictures only, or particular color components only, and the QP is determined based on a sum of the default QP value for a block and the QP offset parameter.

19. The method of claim 13, wherein the size of a block of samples inputted to the NN is restricted to be below a predefined maximum size, the restriction is configured to be applied to luma samples and/or chroma samples, and the restriction is configured to be applied to luma samples in inter pictures only.

20. An apparatus comprising:

a memory; and processing circuitry coupled to the memory, wherein the apparatus is configured to:

receive a bitstream that comprises a mode indication value, wherein the mode indication value indicates whether (i) a weighting factor is indicated in the bitstream or (ii) a default weighting factor should be used as the weighting factor for decoding;

obtain the weighting factor;

obtain reconstructed sample values that are obtained based on a combination of predicted sample values and residual coded sample values;

determine neural network, NN, filtered sample values by providing the reconstructed sample values to a neural network;

determine revised sample values based on (i) the weighting factor and (ii) the NN filtered sample values; and apply a deblocking filtering to the reconstructed sample values, thereby generating deblocked reconstructed sample values, df, wherein determining the revised sample values comprises:

multiplying the weighting factor to (i) the differences between the reconstructed sample values and the NN filtered sample values or (ii) the differences between the deblocked reconstructed sample values and the NN filtered sample values; and adding the result of the multiplication to the reconstructed sample values or the deblocked reconstructed sample values.

* * * * *